United States Patent
Lind et al.

(10) Patent No.: US 8,166,866 B2
(45) Date of Patent: May 1, 2012

(54) PNEUMATIC BRAKE BOOSTER

(75) Inventors: Klaus Lind, Wölfersheim (DE); Jürgen Faller, Kahl (DE)

(73) Assignee: Continetal Teves AG & Co. oHG (DE)

( * ) Notice: Subject to any disclaimer, the term of this patent is extended or adjusted under 35 U.S.C. 154(b) by 891 days.

(21) Appl. No.: 12/282,230

(22) PCT Filed: Feb. 12, 2007

(86) PCT No.: PCT/EP2007/051344
§ 371 (c)(1),
(2), (4) Date: Sep. 9, 2008

(87) PCT Pub. No.: WO2007/104624
PCT Pub. Date: Sep. 20, 2007

(65) Prior Publication Data
US 2009/0056532 A1 Mar. 5, 2009

(30) Foreign Application Priority Data

Mar. 10, 2006 (DE) .......................... 10 2006 011 571
Mar. 22, 2006 (DE) .......................... 10 2006 013 106

(51) Int. Cl.
*F15B 9/10* (2006.01)
(52) U.S. Cl. ...................................................... 92/169.2
(58) Field of Classification Search .................. 91/369.2
See application file for complete search history.

(56) References Cited

U.S. PATENT DOCUMENTS

| | | | |
|---|---|---|---|
| 5,233,904 A | 8/1993 | Gautier et al. | |
| 5,233,905 A | 8/1993 | Fecher | |
| 5,293,808 A | 3/1994 | Rueffer | |
| 5,452,644 A | 9/1995 | Bauer et al. | |
| 5,493,948 A | 2/1996 | Gautier et al. | |
| 2005/0166748 A1* | 8/2005 | Schramm et al. | 91/376 R |

FOREIGN PATENT DOCUMENTS

| | | |
|---|---|---|
| DE | 3941604 A1 | 6/1991 |
| DE | 4208384 A1 | 9/1993 |
| DE | 69303018 T2 | 10/1996 |
| EP | 0509868 A1 | 10/1992 |
| FR | 2864504 | 7/2005 |

* cited by examiner

Primary Examiner — Daniel Lopez
(74) Attorney, Agent, or Firm — RatnerPrestia

(57) ABSTRACT

A pneumatic brake booster with a booster housing is subdivided into at least one working chamber and at least one vacuum chamber by means of at least one axially movable wall capable of being acted upon with a pneumatic differential pressure. An actuable input member includes a valve piston, with an output member for acting upon a brake master cylinder with an output force. A control valve is arranged in a control housing and can be actuated by the valve piston for controlling the differential pressure. An elastic reaction element is arranged in a control housing recess and against which the output member bears. Means for setting a distance z between the valve piston and the reaction element are provided on the output member.

20 Claims, 4 Drawing Sheets

PNEUMATIC BRAKE BOOSTER

CROSS REFERENCE TO RELATED APPLICATIONS

This application is the U.S. national phase application of PCT International Application No. PCT/EP2007/051344, filed Feb. 12, 2007, which claims priority to German Patent Application No. DE102006011571.6, filed Mar. 10, 2006 and German Patent Application No. DE102006013106.1, filed Mar. 22, 2006, the contents of such applications being incorporated by reference herein in their entirety.

BACKGROUND OF THE INVENTION

1. Field of the Invention

The invention relates to a pneumatic brake booster with a booster housing which is subdivided into at least one working chamber and at least one vacuum chamber by means of at least one axially movable wall capable of being acted upon with a pneumatic differential pressure, with an actuable input member comprising a valve piston, with an output member for acting upon a brake master cylinder with an output force, with a control valve which is arranged in a control housing and is actuable by the valve piston and which controls the differential pressure, and with an elastic reaction element which is arranged in a control housing recess and against which the output member bears, means being provided which, with the brake booster assembled, make it possible to set a distance between the valve piston and the reaction element.

2. Description of the Related Art

The automobile industry lays down stringent requirements as regards the brake booster characteristic curve. It is therefore necessary to set the abovementioned distance between the valve piston and the reaction element, what is known as the z-dimension, as accurately as possible. As is known, the z-dimension determines the behavior of the brake booster in the initial phase of its actuation and makes it possible to have an abrupt rise in the output force or in the output pressure when the brake booster is actuated with a predefined input force (jumper effect). Owing to different shore hardnesses of the reaction element and to component tolerances, very high output force tolerances occur, and the output force lies within a very broad range (spread band). The requirements of the automobile industry as regards a very narrow spread band can therefore sometimes not be fulfilled.

A pneumatic brake booster of the generic type initially mentioned is known from DE 39 41 604 A1. In this, the setting of the z-dimension is carried out by changing the axial overall length of the valve piston of two-part design, in that a first piston part is rotated by means of a suitable tool with respect to a second piston part guided fixedly in terms of rotation in the control housing.

In another settable pneumatic brake booster which is known from DE 42 08 384 A1, the setting of the desired z-dimension is carried out by means of a sleeve which is permanently in engagement with the first piston part and is arranged coaxially with respect to the piston rod and which, after the setting operation has ended, is fixed in terms of rotation by means of its positive connection to the control housing. Fixing in terms of rotation in this case takes place preferably by means of a securing ring which is plugged onto the sleeve and the radial projections of which engage into grooves formed on the inner circumference of the control housing. The securing ring is subsequently held by the marginal region of an elastic protective cap protecting the control housing, said marginal region being buttoned in a circumferential groove formed in the sleeve.

The complicated set-up of the known brake booster with a settable z-dimension is considered to be a disadvantage. Furthermore, the connection of the input member to a brake pedal, said connection having to be released during setting, is a disadvantage.

SUMMARY OF THE INVENTION

An object of the invention is to provide a generic brake booster which allows a simple implementation of a very narrow spread band and which has a simple set-up.

The object is achieved in that the means for setting the distance are provided on the output member. The output member is easily accessible, even with a brake booster assembled, with the result that it is possible to implement a very narrow spread band by simple means.

Further, a method for setting the axial distance between the valve piston and the reaction element in a pneumatic brake booster is proposed, the vacuum chamber of which can be acted upon with a vacuum and the working chamber of which can be ventilated, in that a predefined input force acts on the valve piston, while at the same time the output force is being measured, with the particular feature of said method being that the setting of the axial distance takes place by means of a variation of the output member.

Preferably, the means for setting the distance make it possible to vary a chamber volume of the reaction element, the chamber volume of the reaction element being defined by the control housing recess and the output member. When the brake booster, which is connected to a vacuum source, is acted upon, a force-relevant specific pressure is established in the reaction element adequately for the prevailing forces. By the chamber volume being varied, this specific pressure in the reaction element and therefore also the output force can be set with high accuracy.

In an advantageous embodiment of the invention, the output member is provided in two parts with a pressure plate and with a pressure rod, the pressure plate bearing against the reaction element and having an axial central through bore in which is arranged, guided, a tenon having an axial length of the pressure rod. The variation in the chamber volume takes place in a simple way by exchanging the pressure rod having a specific length L of the tenon. Depending on what length the tenon has, the chamber volume of the reaction element is increased or reduced in a simple way. It is in this case advantageous if the pressure rod has on its outside means for identifying the length of the tenon, with the result that mistakes between pressure rods can be ruled out.

In order to influence the jumper effect in a simple way, according to an advantageous embodiment of the invention a convex curvature may be provided at a free end of the tenon.

In another advantageous embodiment of the invention, the free end of the tenon has a convexly curved design. Further, the free end of the tenon may be designed conically.

In order to make it easier to introduce the tenon into the through bore of the pressure plate, a radius or an introduction slope is provided at a free end of the tenon.

Preferably, the pressure plate is provided as essentially disk-shaped, with the result that a very simple production of the pressure plate can be achieved.

According to an advantageous embodiment, the pressure plate may have a shank which is formed in the direction of the pressure rod and which is guided in a guide dish arranged on the control housing. In this case, the exchange of the pressure rod is simplified.

A good guidance of the pressure rod can be achieved in that the pressure plate has a shank which is formed in the direction of the pressure rod and which is guided partially in a guide dish arranged on the control housing.

Preferably, the pressure plate, too, has an introduction slope on an inside, thus making it even easier to introduce the tenon.

A variation in the chamber volume of the reaction element can be achieved, without an exchange of a component of the output member, in that the output member has, on a side facing the reaction element, a threaded bore into which a headless screw can be screwed, the headless screw allowing a variation in the chamber volume of the reaction element. The output member forms with the headless screw a premountable subassembly, with the result that mounting is simplified because of the small number of components. The headless screw allows a continuous setting of the output force in the case of a specific input force, that is to say continuous setting under load, with the result that the shore hardness spread of the reaction element can additionally be compensated.

To rotate the headless screw, the output member has a through bore which issues into the threaded bore and through which an adjusting tool for rotating the headless screw can be introduced. After the setting operation, the adjusting tool can be removed again without great effort, and the rotation of the headless screw allows a highly accurate setting of the specific pressure of the reaction element.

In an advantageous embodiment of the invention, a washer is provided between the headless screw and the reaction element, the output member having, on the side facing the reaction member, a recess with a diameter, in which the washer is arranged. Providing the recess and the washer reduces the gap extrusion of the reaction element, since, for manufacturing reasons, very much lower tolerances can be implemented between the recess and the washer than between the threaded bore and the headless screw. Owing to the diminished gap extrusion, the wear of the reaction element is reduced.

Preferably, the diameter of the recess is provided so as to be larger than a diameter of the threaded bore, with the result that more favorable surface ratios are obtained and the recess for the washer can be produced more simply.

In order to influence the jumper effect in another simple way, according to an advantageous embodiment of the invention the washer can have a convex curvature on a side facing the reaction element.

In other advantageous embodiments of the invention, the washer is provided as being convexly curved or conical on the side facing the reaction element.

In order to prevent the washer from falling out of the recess of the output member, for example during the transport of the output member, according to an advantageous embodiment an adhesive film is provided on one end face of the output member. If the adhesive film is selected in such a way that the setting of the z-dimension can take place in spite of the film being applied, the latter may remain on the output member after the output member has been mounted in the brake booster. The gap extrusion of the reaction element is thereby prevented completely. If the adhesive film is provided on the end face of the output member when there is only a headless screw without a washer, the gap extrusion of the reaction element can thereby be prevented, without a washer being provided.

Preferably, between the valve piston and the reaction element, a step-up washer may be provided, by means of which the valve piston is in force-transmitting connection to the reaction element, and therefore the step-up washer may be considered as part of the input member or of the valve piston.

The brake booster may be provided both as a conventional brake booster and so as to be activatable electrically by means of a magnetic drive. Furthermore, the brake booster may also have a mechanical brake assistance function.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
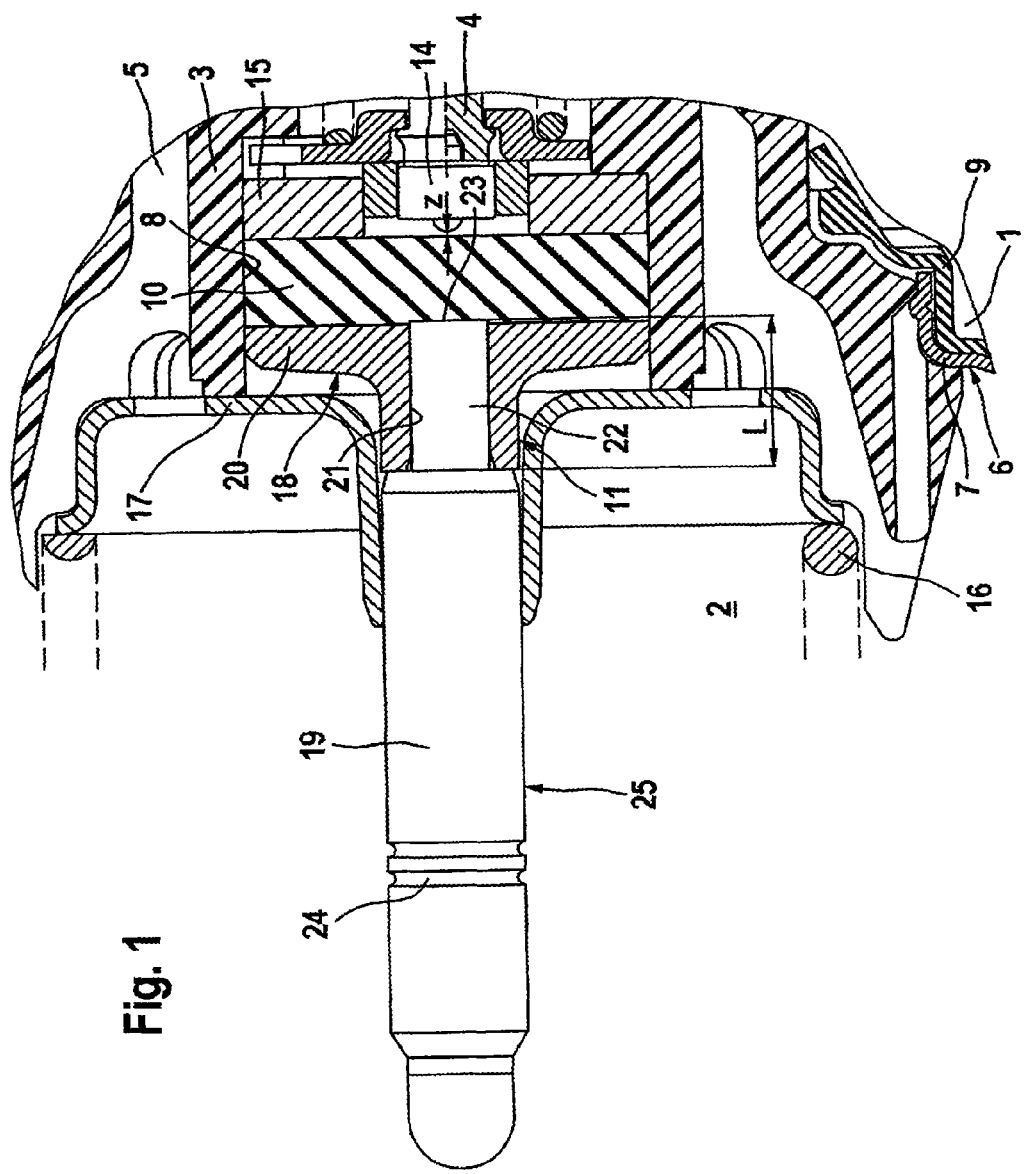
FIG. 1 shows a part view of a first exemplary embodiment of a pneumatic brake booster according aspects of to the invention in longitudinal section.

FIG. 1 shows a part view of a first exemplary embodiment of a pneumatic brake booster according to aspects of the invention of a motor vehicle brake system in longitudinal section, the part view showing only the parts of the brake booster which are essential for the invention.

As is generally known, a booster housing, not illustrated, of the brake booster shown in FIG. 1 is subdivided into a working chamber 1 and a vacuum chamber 2 by an axially movable wall 6. The axially movable wall 6 consists of a diaphragm dish 7 deep-drawn from sheet metal and of a flexible diaphragm 9 which bears against this and which forms, not illustrated, between the outer circumference of the diaphragm dish 7 and the booster housing a diaphragm which acts as a seal.

A control valve actuable by means of an input member, not shown, is accommodated in a control housing 3 guided, sealed off, in the booster housing and carrying the movable wall 6 and consists of a first sealing seat formed on the control housing 3, of a second sealing seat formed on a valve piston 4 connected to the input member, and of a valve body cooperating with the two sealing seats. The valve body is pressed against the valve seats by means of a valve spring which is supported on a guide element. The working chamber 1 is connectable to the vacuum chamber 2 via a duct 5 running laterally in the control housing 3, and the input member is connected to a brake pedal, not illustrated.

Figure 8:
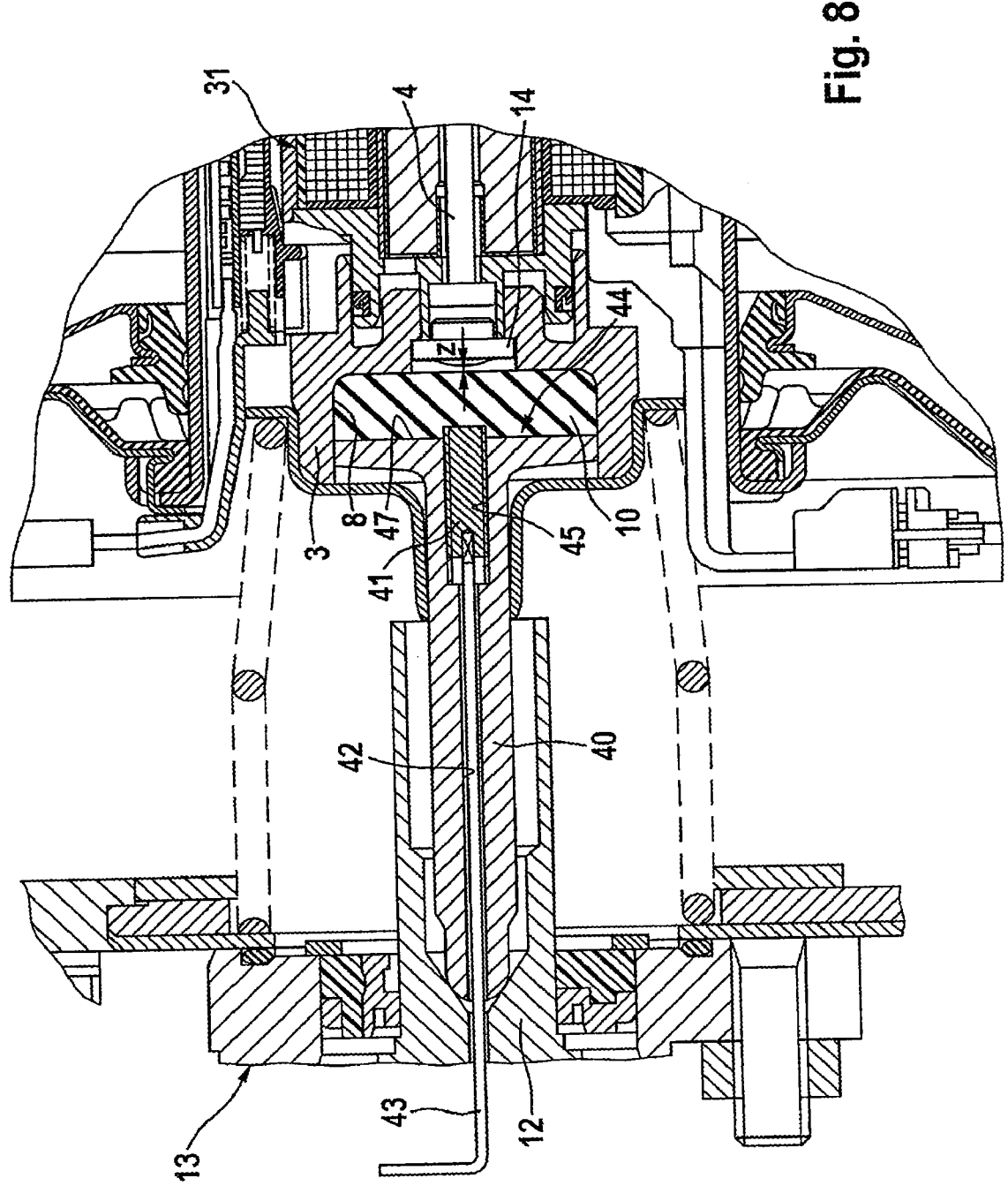
FIG. 8 shows a part view of a second exemplary embodiment of a pneumatic brake booster according to aspects of the invention in longitudinal section.

The brake force is transmitted, via an elastomeric reaction element 10 arranged in a control housing recess 8 and via an output member 11 bearing against the reaction element 10, to an actuating piston 12 of a brake master cylinder 13, illustrated suggestively in FIG. 8, of the motor vehicle brake system, said brake master cylinder being attached to the vacuum-side end of the brake booster. The input force introduced at the input member is transmitted to the reaction element 10 by means of the valve piston 4. As is clear from FIG. 1, between the valve piston 4 and the reaction element 10 a step-up washer 14 is provided, by means of which the valve piston 4 is in force-transmitting connection to the reaction element 10. The step-up washer 14 is not necessarily required for functioning and for the invention and is considered as part of the input member or of the valve piston 4.

The reaction element 10 is produced in disk form from plastic or rubber material and under pressure stress behaves according to the laws of hydrostatics in the same way as an incompressible fluid. That is to say, it functions as it were as an adder between the foot forces introduced by the valve piston 4, the boosting forces introduced by the control housing 3 and the brake reaction forces which are to be transmitted back to the vehicle driver via the output member 11. Consequently, in each brake actuation position, a force equilibrium prevails at the reaction element 10. As is clear, a chamber volume of the reaction element 10 is determined by the control housing recess 8 and the output member 11 and by a washer 15 arranged in the control housing recess 8. This configuration of the chamber volume with the washer 15 is not absolutely necessary. As is evident from FIG. 8, the reaction element 10 may also bear in the axial direction against the control housing 3 itself.

A restoring spring 16, illustrated diagrammatically in the drawing, which is supported on the vacuum-side end wall of the booster housing at a flange, not shown, holds the movable wall 6 in the release position. Furthermore, the restoring spring 16 is supported on a guide dish 17 which bears against the control housing 3 or is fastened to the latter and which serves, on the one hand, for supporting the restoring spring 16 and, on the other hand, for guiding the output member 11. Moreover, a recuperating spring, not shown, is provided, which is arranged between the input member or a washer bearing against the latter and the guide element of the control valve and the force of which ensures a prestressing of the valve piston 4 or of its valve seat with respect to the valve body.

So that the working chamber 1 can be connected to the atmosphere when the control valve is actuated, finally, an approximately radially running duct, not shown, is formed in the control housing 5. The return movement of the valve piston 4 at the end of a braking operation is in this case limited by a crossmember which, in the release position of the brake booster, bears against a stop formed on the booster housing.

In the release position, between the valve piston 4 or the step-up washer 14 and the reaction element 10, a distance z is provided, which is known as the z-dimension and constitutes what is known as a jumper. The z-dimension determines the behavior of the brake booster in the initial phase of its actuation and makes it possible to have an abrupt rise in the output force or in the output pressure when the brake booster is actuated with a predefined input force.

The automobile industry lays down stringent requirements as regards the brake booster characteristic curve. It is therefore necessary to set the abovementioned distance z between the valve piston 4 or the step-up washer 14 and the reaction element 10 as accurately as possible. Owing to different Shore hardnesses of the reaction element 10 and to component tolerances, very high output force tolerances of up to ±175 N normally occur, and the output force does not lie within the range of, for example, max. ±50 N (spread band) fixed very narrowly by the automobile industry.

As is clear from FIG. 1, the output member 11 is provided in two parts with a pressure plate 18 and with a pressure rod 19. The pressure plate 18 bears with a flange 20 against the reaction element 10 and has an axial central through bore 21 in which is arranged, guided, a tenon 22 of the pressure rod 19 having an axial length L. The tenon 22 may be referred to hereinafter as a stem.

The setting of the distance z at the mounting line is carried out by connecting the brake booster to a vacuum source, not shown, so that a specific operating pressure prevails in the booster housing. Further, the brake booster is acted upon with a specific input force $F_E$, for example 200 N. As a consequence of the prevailing vacuum, of the distance z and of the shore hardness of the reaction element 10, a specific output force $F_A$ is attained. A force-relevant specific pressure is established in the reaction element 10 adequately for the prevailing forces.

Setting the z-dimension under load has the particular advantage that, in contrast to a setting of the z-dimension by measurement and a corresponding change of the z-dimension, the shore hardness spread of the reaction element 10 can also be compensated in addition to the component tolerances.

By the exchange of the pressure rod 19 having a tenon 22 of specific length L, the chamber volume of the reaction element 10 or the specific pressure in the reaction element 10 can be varied, with the result that the output force $F_A$ can be set. The force/force measurement takes place first by means of a pressure rod 19 in which one end face 23 of the tenon 22 is level with the flange 20 of the pressure plate 18 (neutral position).

A longer tenon 22 causes a deformation of the reaction element 10 and consequently a reduction in the distance z. By contrast, a shorter tenon 22 causes an increase in the distance z, and the reaction force of the reaction element 10 becomes lower.

When the specific pressure in the reaction element 10 rises, a regulation of the brake booster is brought about via the connection to the valve piston 4 or to the step-up washer 14, with the result that the output force $F_A$ is reduced. In contrast to this, the output force $F_A$ rises when the specific pressure in the reaction element 10 is reduced by means of a shorter tenon 22, that is to say by means of an increase in the chamber volume.

To identify the pressure rod 19 having a specific length L of the tenon 22, for example, grooves 24 may be provided on the outside 25 of said pressure rod.

Figure 2:
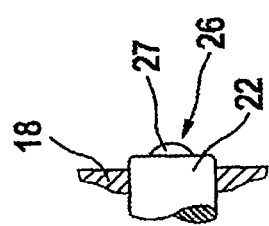
FIGS. 2 to 4 show different embodiments of a tenon of a pressure rod of the pneumatic brake booster according to aspects of the invention, as shown in FIG. 1.
Figure 3:
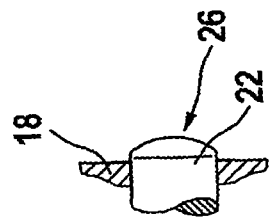
Figure 4:
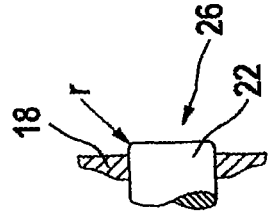

Furthermore, as shown in FIGS. 2 to 4, a free end 26 of the tenon 22 may be configured differently, in order to influence the jumper effect or in order to make it easier to introduce the tenon 22 into the through bore 21 of the pressure plate 18. Thus, for example, according to FIG. 2, a convex curvature 27 may be provided at the end 26 or, according to FIG. 3, the end 26 may have a convexly curved design. As a further alternative, not shown, the free end 26 may be shaped conically.

As is clear from FIG. 4, a radius r or an introduction slope may be provided at the free end 26 of the tenon 22, in order to make it easier to mount the tenon 22.

Figure 7:
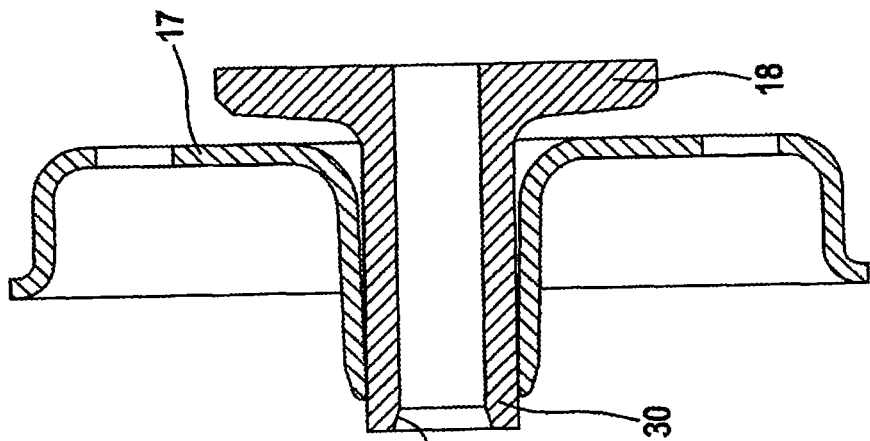
FIGS. 5 to 7 show different embodiments of a pressure plate of the pneumatic brake booster according to aspects of the invention, as shown in FIG. 1.
Figure 6:
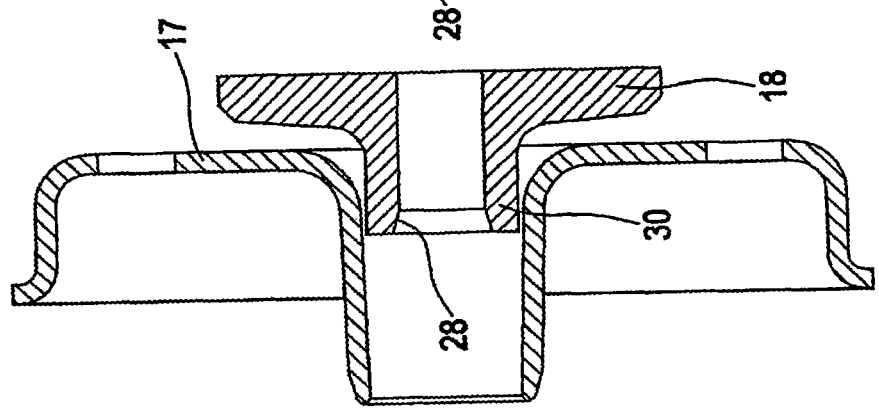
Figure 5:
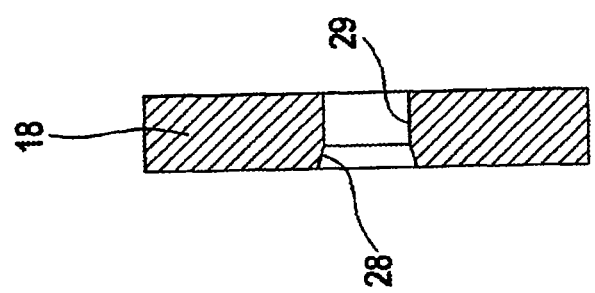

FIGS. 5 to 7 show different embodiments of the pressure plate 18. This may be essentially disk-shaped according to FIG. 5, with the result that the capability of simple production is achieved. An introduction slope 28 on an inside 29 additionally makes it easier to mount the pressure rod 19.

According to FIGS. 6 and 7, the pressure plate 18 has a shank 30 which is formed in the direction of the pressure rod 19 and which is guided partially or completely in the guide dish 17. The partial guidance according to FIG. 6 or else according to FIG. 1 has the advantage that the pressure rod 19, too, can be guided by means of the guide dish 17.

FIG. 8 shows a part view of a second exemplary embodiment of a brake booster according to aspects of the invention in longitudinal section. In this exemplary embodiment, the brake booster is configured as an electrically activatable brake booster with a magnetic drive 31, this not being absolutely necessary for the invention. The exemplary embodiment can likewise be transferred to a conventional brake booster.

As may be gathered from FIG. 8, in the output member 40 of the second embodiment a headless screw 41 is provided, integrated, on a side 44 facing the reaction element 10 and makes it possible to vary the chamber volume of the reaction element 10. The headless screw 41 can be screwed into a threaded bore 45, the length of which may be different, depending on the dimensioning of the output member 40. To rotate the headless screw 40, the output member 40 has a through bore 42 which issues into the threaded bore 45 and through which an adjusting tool 43 can be introduced.

The setting of the distance z between the reaction element 10 and the valve piston 4 or a step-up washer 14 takes place, in a similar way to the embodiment according to FIG. 1, under load with a specific input force $F_E$, the difference being that the output member 40 or part of the output member does not have to be exchanged, but, instead, the headless screw 41 merely has to be rotated in order to vary the chamber volume of the reaction element 10. The headless screw 41 allows a continuous setting of the output force $F_A$ in the case of a specific input force $F_E$, with the result that the shore hardness spread of the reaction element 10 can be compensated.

Figure 9:
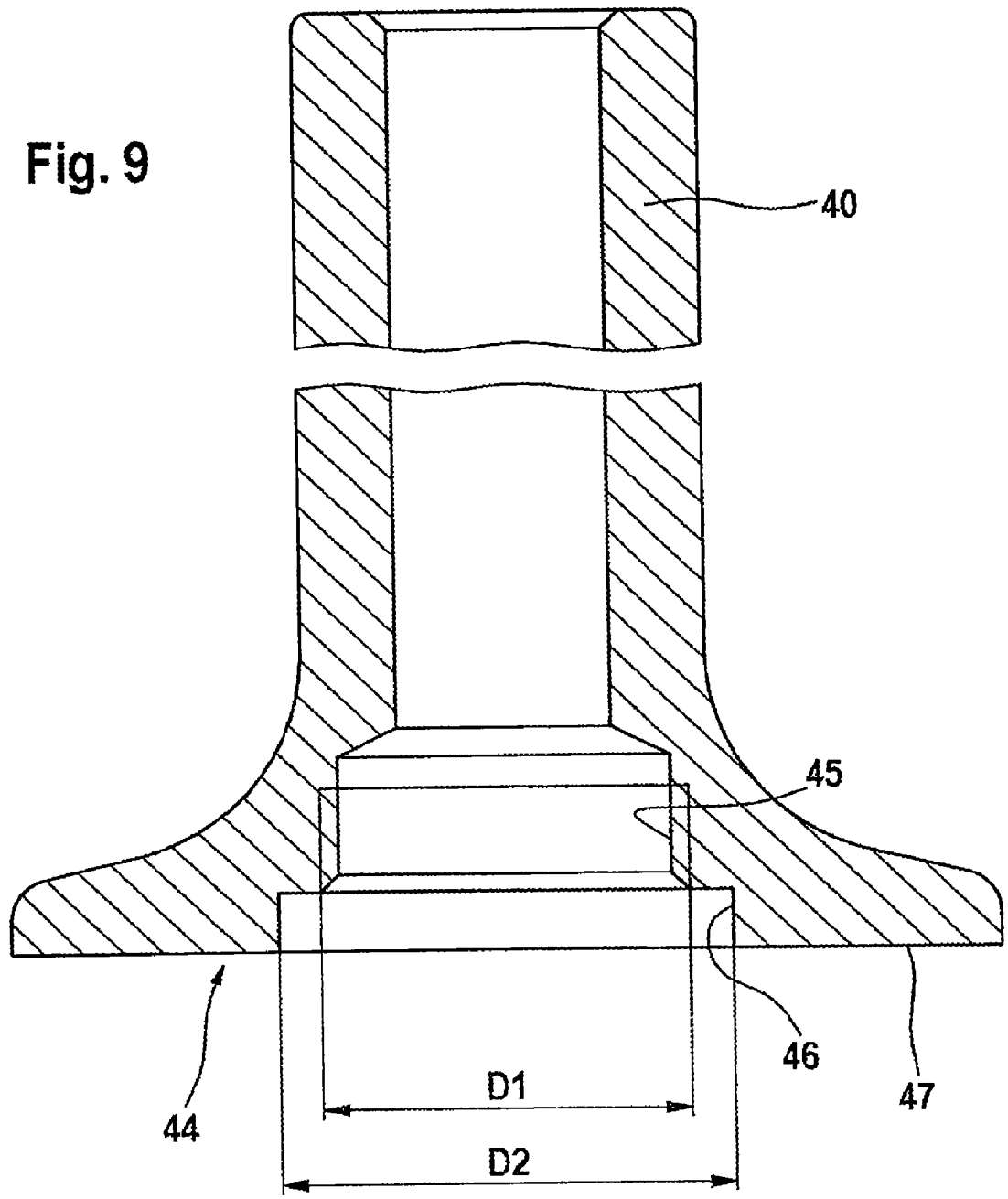
FIG. 9 shows a part view of a slightly modified output member of the second exemplary embodiment according to FIG. 8 in longitudinal section.

FIG. 9 shows a part view of a slightly modified output member 40 of the second exemplary embodiment according to FIG. 8 in longitudinal section. As is clear, the output member 40 has on the side 44 a centrally provided recess 46 which the threaded bore 45 adjoins. In this recess, between the headless screw 41 and the reaction element 10, is a washer, not illustrated, which, by the headless screw 41 being rotated, increases or reduces the chamber volume of the reaction element 10. The washer must therefore be dimensioned in such a way that it can penetrate into the recess 46.

In a first setting, the headless screw 41 is screwed into the threaded bore 46 to an extent such that the washer and the end face 47 of the output member 40 are flush (neutral position).

By the washer being provided, the gap extrusion of the reaction element 10 and therefore the wear of the latter can be reduced, since, for manufacturing reasons, very much lower tolerances can be implemented between the recess 46 and the washer than between the threaded bore 45 and the headless screw 41.

The recess has a diameter D2 which is provided to be larger than a diameter D1 of the threaded bore 45. As a result, more favorable surface ratios are obtained and the recess 46 can be produced without difficulty.

As already described with regard to the tenon 22 according to FIGS. 2 and 3, the washer can, on a side facing the reaction element 10, have a convex curvature or be of convexly curved or conical configuration, in order to influence the jumper effect in a simple way.

In order to prevent the washer from falling out of the recess of the output member, an adhesive film may be provided on the end face 47 of the output member 40 in order to secure the washer during transport. This film may remain on the output member 40 after mounting if it is provided so as to be so resistant that the setting of the z-dimension can be carried out in spite of the film being applied. By means of the adhesive film, on the one hand, it becomes possible to secure the mounted output member 40, with headless screw 41 and washer, during transport and, on the other hand, the gap extrusion of the reaction element 10 is prevented completely.

The attachment of the adhesive film described is likewise possible on the end face 47 of the output member 40 according to FIG. 8 where there is a headless screw 41 without a washer. The gap extrusion of the reaction element 10 can thereby be prevented, without the washer having to be provided.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A pneumatic brake booster comprising:
   a booster housing subdivided into at least one working chamber and at least one vacuum chamber by at least one axially movable wall that is configured to be acted upon by a pneumatic differential pressure,
   a valve piston,
   an output member for acting upon a brake master cylinder with an output force,
   a control valve arranged in a control housing and configured to be actuated by the valve piston, wherein the control valve controls the differential pressure,
   an elastic reaction element arranged in a control housing recess of the control housing, wherein the output member is positioned to bear on the elastic reaction element, and
   means for setting a distance (z) between the valve piston and the reaction element, wherein the means for setting the distance (z) are provided on the output member,
   wherein the output member comprises a pressure plate and a pressure rod, the pressure plate bearing against the reaction element and having an axial central through-bore that is sized for receiving and guiding a stem of the pressure rod,
   wherein the pressure rod includes a means for identifying a length of the stem.

2. The brake booster as claimed in claim 1, wherein the means for setting the distance (z) is also configured to vary a chamber volume of the elastic reaction element, the chamber volume of the elastic reaction element being determined by the control housing recess and the output member.

3. The brake booster as claimed in claim 1, wherein a convex curvature is provided at a free end of the stem.

4. The brake booster as claimed in claim 1, wherein a free end of the stem is conical.

5. The brake booster as claimed in claim 1, wherein a radius or an introduction slope is provided at a free end of the stem.

6. The brake booster as claimed in claim 1, wherein the pressure plate is substantially disk-shaped.

7. The brake booster as claimed in claim 1, wherein the pressure plate includes a shank formed in a direction of the pressure rod, wherein the shank is guided in a guide dish arranged on the control housing.

8. The brake booster as claimed in claim 1, wherein the pressure plate includes a shank formed in a direction of the pressure rod, wherein the shank is guided partially in a guide dish arranged on the control housing.

9. The brake booster as claimed in claim 1, wherein an interior surface of the pressure plate includes an introduction slope.

10. The brake booster as claimed in claim 1 further comprising an adhesive film provided on one end face of the output member.

11. The brake booster as claimed in claim 1 further comprising a step-up washer positioned between the valve piston and the reaction element for transmitting force between the valve piston and the reaction element.

12. The brake booster as claimed in claim 1, wherein the brake booster is configured to be activated electrically by means of a magnetic drive.

13. A pneumatic brake booster comprising:
- a booster housing subdivided into at least one working chamber and at least one vacuum chamber by at least one axially movable wall that is configured to be acted upon by a pneumatic differential pressure,
- a valve piston,
- an output member for acting upon a brake master cylinder with an output force,
- a control valve arranged in a control housing and configured to be actuated by the valve piston, wherein the control valve controls the differential pressure,
- an elastic reaction element arranged in a control housing recess of the control housing, wherein the output member is positioned to bear on the elastic reaction element, and
- means for setting a distance (z) between the valve piston and the reaction element, wherein the means for setting the distance (z) are provided on the output member,
- wherein the means for setting the distance (z) is also configured to vary a chamber volume of the elastic reaction element, the chamber volume of the elastic reaction element being determined by the control housing recess and the output member,
- wherein a side of the output member that faces the reaction element includes a threaded bore for threadedly receiving a screw, the screw being configured to vary the chamber volume of the elastic reaction element.

14. The brake booster as claimed in claim 13, wherein the output member has a through-bore which issues into the threaded bore of the output member, the through-bore being sized for receiving an adjusting tool for rotating the screw.

15. The brake booster as claimed in claim 13, further comprising a washer provided between the screw and the reaction element, wherein a side of the output member facing the reaction element includes a recess with a diameter (D2) for receiving the washer.

16. The brake booster as claimed in claim 15, wherein the diameter (D2) of the recess is larger than a diameter (D1) of the threaded bore.

17. The brake booster as claimed in claim 15, wherein the side of the output member facing the reaction element has a convex curvature.

18. The brake booster as claimed in claim 15, wherein the washer is convexly curved on a side facing the reaction element.

19. The brake booster as claimed in claim 15, wherein a side of the washer facing the reaction element is conical.

20. A method for setting an axial distance (z) between a valve piston and a reaction element of a pneumatic brake booster, said method comprising the steps of:
- applying a vacuum to a vacuum chamber of a booster housing;
- ventilating a working chamber of the booster housing;
- applying a predefined input force ($F_E$) on the valve piston, such that the valve piston bears on the reaction member which bears on an output member, wherein the output member is operatively coupled to a brake master cylinder;
- measuring an output force ($F_A$) of the output member;
- varying the output member to set the axial distance (z) between the valve piston and the reaction element of the pneumatic brake booster by rotating a screw into a threaded bore of the output member that faces the reaction element to set the axial distance (z).

* * * * *